(12) United States Patent
Kim

(10) Patent No.: US 7,913,082 B2
(45) Date of Patent: Mar. 22, 2011

(54) AUTHENTICATING ADDRESS OWNERSHIP USING CARE-OF ADDRESS (COA) BINDING PROTOCOL

(75) Inventor: Byoung-Chul Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1626 days.

(21) Appl. No.: 11/028,859

(22) Filed: Jan. 5, 2005

(65) Prior Publication Data

US 2006/0050671 A1 Mar. 9, 2006

(30) Foreign Application Priority Data

Sep. 7, 2004 (KR) .................. 10-2004-0071355

(51) Int. Cl.
*H04L 29/06* (2006.01)
(52) U.S. Cl. ............... 713/162; 726/4; 726/16; 726/26; 713/170; 713/179; 713/182; 380/262; 380/270; 370/338
(58) Field of Classification Search .............. 726/26, 726/4, 16; 713/162, 170, 182, 179; 380/262, 380/270; 360/317; 370/338
See application file for complete search history.

(56) References Cited

U.S. PATENT DOCUMENTS

| | | | | |
|---|---|---|---|---|
| 6,578,085 B1 * | 6/2003 | Khalil et al. | ................... | 709/241 |
| 6,721,297 B2 * | 4/2004 | Korus et al. | ................... | 370/338 |
| 7,155,500 B2 * | 12/2006 | Nikander | ..................... | 709/223 |
| 7,233,782 B2 * | 6/2007 | Bao et al. | ................... | 455/404.2 |
| 7,272,122 B2 | 9/2007 | Trossen | | |
| 7,274,704 B1 * | 9/2007 | Ould-Brahim et al. | ....... | 370/409 |
| 7,277,434 B2 | 10/2007 | Astarabadi | | |
| 7,280,506 B2 | 10/2007 | Lin | | |
| 7,284,068 B1 | 10/2007 | Ramalho | | |
| 7,292,565 B2 | 11/2007 | Ono | | |
| 7,298,720 B2 | 11/2007 | Yamada | | |
| 7,298,743 B2 | 11/2007 | Markki | | |
| 7,298,847 B2 | 11/2007 | Jing | | |

(Continued)

FOREIGN PATENT DOCUMENTS

JP 2000-299683 10/2000

(Continued)

OTHER PUBLICATIONS

European Office Action of the European Patent Application No. 05019305, mailed on Jan. 16, 2006.

(Continued)

*Primary Examiner* — Michael J Simitoski
*Assistant Examiner* — Kari L Schmidt
(74) *Attorney, Agent, or Firm* — H.C. Park & Associates, PLC

(57) ABSTRACT

A method for authenticating address ownership using a Care-of Address (CoA) binding protocol, the method includes a comparison of two hash-function-processed result values, i.e., a first hash-function-processed result value transmitted from a home agent, the first hash-function-processed result value encrypted by a public key of a correspondent node and decrypted by a secret key of the correspondent node, and a second hash-function-processed result value piggybacked in a binding update message transmitted from a mobile node. The hash-function-processed result values are obtained by applying hash functions to a care-of address of a mobile node to be used in a foreign link, a random number generated by a home agent and a secret key shared by the home agent and the mobile node.

8 Claims, 4 Drawing Sheets

U.S. PATENT DOCUMENTS

| | | |
|---|---|---|
| 7,299,044 B2 | 11/2007 | Ikeda |
| 7,301,923 B2 | 11/2007 | Petrescu |
| 7,301,957 B2 | 11/2007 | Lee |
| 7,302,487 B2 | 11/2007 | Ylonen |
| 7,313,631 B1 | 12/2007 | Sesmun |
| 7,315,519 B2 | 1/2008 | Sarikaya |
| 7,317,709 B2 | 1/2008 | Jang |
| 7,319,689 B2 | 1/2008 | Dutta |
| 7,321,587 B2 | 1/2008 | Gao |
| 7,324,474 B2 | 1/2008 | Shirota |
| 7,324,492 B2 | 1/2008 | Leung |
| 7,328,009 B2 | 2/2008 | Takeda |
| 7,328,018 B2 | 2/2008 | Lee |
| 7,333,451 B1 | 2/2008 | Khalil |
| 7,333,454 B2 | 2/2008 | Yang |
| 7,333,482 B2 | 2/2008 | Johansson |
| 7,339,928 B2 | 3/2008 | Choyi |
| 7,339,931 B2 | 3/2008 | Takihiro |
| 7,342,903 B2 | 3/2008 | O'Neill |
| 7,346,053 B1 | 3/2008 | Leung |
| 7,346,684 B2 | 3/2008 | Borella |
| 7,346,771 B2 | 3/2008 | Narayanan |
| 7,349,328 B2 | 3/2008 | Wtanabe |
| 7,349,377 B2 | 3/2008 | Le |
| 7,353,029 B2 | 4/2008 | Choi |
| 7,356,020 B2 | 4/2008 | O'Neill |
| 7,356,595 B2 | 4/2008 | Soininen |
| 7,363,492 B2 | 4/2008 | Kuhlman et al. |
| 7,366,136 B1 | 4/2008 | Kalbag |
| 7,366,147 B2 | 4/2008 | O'Neill |
| 7,369,855 B2 | 5/2008 | O'Neill |
| 7,370,197 B2 * | 5/2008 | Huitema ............... 713/162 |
| 7,380,000 B2 | 5/2008 | Yaqub |
| 7,385,946 B2 | 6/2008 | Devarapalli |
| 7,385,957 B2 | 6/2008 | O'Neill |
| 7,388,851 B2 | 6/2008 | Trossen |
| 7,389,412 B2 | 6/2008 | Sharma |
| 7,401,216 B2 | 7/2008 | Arkko |
| 7,415,512 B1 | 8/2008 | Moon |
| 7,418,510 B2 | 8/2008 | Sakakura |
| 7,426,202 B2 | 9/2008 | Warrier |
| 7,426,213 B2 | 9/2008 | Xu |
| 7,430,174 B2 | 9/2008 | Janneteau |
| 7,433,297 B2 | 10/2008 | Barton |
| 2001/0044895 A1 | 11/2001 | Hada |
| 2003/0161287 A1 * | 8/2003 | Venkitaraman et al. ...... 370/338 |
| 2003/0210787 A1 * | 11/2003 | Billhartz et al. ............ 380/270 |
| 2003/0211842 A1 * | 11/2003 | Kempf et al. ............ 455/411 |
| 2004/0044824 A1 * | 3/2004 | Haneda et al. .................. 711/1 |
| 2004/0202183 A1 * | 10/2004 | Thubert et al. ........ 370/395.31 |
| 2004/0236937 A1 * | 11/2004 | Perkins et al. ............. 713/150 |
| 2005/0041634 A1 * | 2/2005 | Aura ........................ 370/351 |
| 2005/0044362 A1 * | 2/2005 | Haddad et al. ............ 713/170 |
| 2005/0055576 A1 * | 3/2005 | Mononen et al. ......... 713/201 |
| 2005/0237983 A1 * | 10/2005 | Khalil et al. .............. 370/338 |
| 2006/0018291 A1 * | 1/2006 | Patel et al. ................ 370/335 |
| 2006/0023887 A1 * | 2/2006 | Agrawal et al. ............ 380/277 |
| 2008/0144666 A1 | 6/2008 | Ross |

FOREIGN PATENT DOCUMENTS

| | | |
|---|---|---|
| JP | 2002-268546 | 9/2002 |
| JP | 2004-135178 | 4/2004 |
| JP | 2004-234118 | 8/2004 |
| WO | WO 2004/021719 | 3/2004 |

OTHER PUBLICATIONS

An article "Mobile IP version 6 Route Optimization Security Design Background" written by Nikander, et al., published in IETF Standard-Working-Draft, Internet Engineering Task Force, vol. mip6, No. 1 on Jul. 19, 2004.

An article "Authentication of Mobile IPv6 Binding Updates and Acknowledgments" written by Roe, et al., published in IETF Standard-Working-Draft, Internet Engineering Task Force, No. 1 on Nov. 2001.

"*Piggyback a Common Message on bidirectional Relaying,*" by Oechtering et al., IEEE, Modeling and Optimization in Mobile, AdHoc and Wireless Network and Workshops, 2007. vol. 5, issue, Apr. 16-20, 2007 pp. 1-8.

Office actin from the Japanese Patent Office issued in Applicant's corresponding Japanese Patent Application No. 2005-256363 dated Jan. 13, 2009.

http://en.wikipedia.org/wiki/Zero-knowledge_proof "Zero-knowledge proof".

http://en.wikipedia.org/wiki/Hash_function "Hash function".

http://en.wikipedia.org/wiki/Cryptographic_hash_function "Cryptographic bash function".

http://en.wikipedia.org/wiki/Mobile_ad_hoc_network "Mobile ad hoc network".

* cited by examiner

AUTHENTICATING ADDRESS OWNERSHIP USING CARE-OF ADDRESS (COA) BINDING PROTOCOL

CLAIM OF PRIORITY

This application makes reference to, incorporates the same herein, and claims all benefits accruing under 35 U.S.C. §119 from an application for METHOD AND SYSTEM FOR AUTHENTICATING ADDRESS OWNERSHIP USING CARE OF ADDRESS BINDING PROTOCOL earlier filed in the Korean Intellectual Property Office on Sep. 7, 2004 and there duly allocated Serial No. 2004-71355.

BACKGROUND OF THE INVENTION

1. Field of the Invention

The present invention relates generally to authenticating address ownership in a mobile communication system and, more particularly, to authenticating address ownership using a Care-of Address (CoA) binding protocol of a mobile Internet Protocol version 6 (IPv6) host.

2. Description of the Related Art

Address ownership refers to a procedure of proving a host having an IPv6 address to be an authorized or legitimate user of the IPv6 address which is not maliciously altered or tampered.

Particularly, a problem on the IPv6 address ownership becomes weaker to hosts, such as mobile IPv6 hosts that make use of a care-of address (CoA) while moving between networks. In order to prove ownership of an IPv6 address of the mobile IPv6 host, an additional message exchange and an overhead are required between a home agent (HA) and a correspondent node (CN).

When the mobile IPv6 host moves from a home network to a foreign network, it obtains a network prefix of the foreign network through a router solicitation (RS) message and a router advertisement (RA) message. In order to create the CoA through address auto-configuration and resolve a triangle route problem being questionable in a mobile IPv4, the mobile IPv6 host registers, i.e., binding-updates, the CoA with the HA and the CN. When the CoA is registered, the mobile IPv6 host can directly communicate data with the CN without a function of data tunneling of the HA.

In a procedure where a mobile node moves to a foreign link to bind a CoA and performs communication, when a mobile node (MN) communicating with an arbitrary correspondent node (CN) moves from its own home network to an arbitrary foreign link (FL), the MN transmits a router solicitation (RS) message to the FL. The FL then transmits a router advertisement (RA) message to the MN. The MN obtains a network prefix of the FL from the RA message, and creates a CoA to be used in the FL through address auto-configuration.

Then, the MN transmits a binding update message to the HA to inform it that it has moved to the FL.

When the HA receives the binding update message from the MN informing it that the CoA is allocated from the FL as the MN moves to the FL, the HA stores the CoA contained in the binding update message received from the MN together with a home address of the MN, and transmits a binding acknowledgment message to the MN informing it that a binding of the CoA to the MN has been carried out normally.

Then, the HA tunnels data transmitted from the MN to the CN before the MN binds the CoA to the CN, and tunnels data transmitted from the CN to the MN.

Next, the MN transmits a binding update message to the CN in order to perform a binding update of the CoA.

The CN receives the binding update message from the MN to perform the binding update, and then transmits a binding acknowledgment message to the MN.

As a result, both the MN receiving the binding acknowledgment message from the CN and the CN form a tunnel therebetween, and transceive the data through the formed tunnel.

However, when a malicious mobile IPv6 host binds a wrong CoA to the CN while the MN creates the CoA and registers it with the HA, an authorized IPv6 host having a home network address which the malicious IPv6 host is disguising can not communicate with the CN.

This is because the mobile IPv6 host fails to prove ownership of its own IPv6 address used in the process of registering the CoA with the HA and the CN.

SUMMARY OF THE INVENTION

It is, therefore, an object of the present invention to provide a method and system to authenticate address ownership using a Care-of Address (CoA) binding protocol, in which, in the process of producing a CoA and registering the produced CoA with a home agent, a mobile IPv6 host newly authenticates ownership of the CoA registered with a correspondent node using data tunneling performed by the home agent, thereby preventing an unauthorized host from abusing any other host address.

According to an aspect of the present invention, a method is provided including: producing a random number, encrypting the random number using a secret key shared by a home agent and a mobile node, piggybacking the encrypted random number in a binding acknowledge message, and transmitting the binding acknowledge message having the encrypted random number to the mobile node by the home agent upon the mobile node piggybacking a list of correspondent nodes requiring registration of a Care-of-Address (CoA) in a binding update message to register the CoA with the home agent and transmitting the binding update message having the list of correspondent nodes to the home agent; obtaining public keys of the corresponding correspondent nodes based on the list of correspondent nodes, encrypting first information required for authentication of the mobile node using the public keys, piggybacking the encrypted first information in data to be tunneled to the correspondent nodes, and transmitting the data having the encrypted first information to the correspondent nodes by the home agent; and decrypting the first information received from the home agent using a secret key of the correspondent node and comparing the first information received from the home agent with a second information received from the mobile node to authenticate ownership of the corresponding mobile node by the correspondent node upon the mobile node piggybacking the second information required for ownership authentication in the binding update message to register the CoA with the correspondent node and transmitting the binding update message having the second information to the correspondent node.

The first information and the second information preferably comprise result values processed by hash functions to prove the ownership of the mobile node using a zero knowledge technique.

The result values processed by hash functions preferably comprise result values processing the CoA, the random number and the secret key using the hash functions.

The method preferably further comprises using previously stored public key information with respect to the corresponding correspondent node by the home agent upon the list of correspondent nodes that the home agent has received from the arbitrary mobile node including the correspondent node having the previously stored information of the public key.

According to another aspect of the present invention, a method is provided including: piggybacking a list of correspondent nodes requiring registration of a Care-of-Address (CoA) in a binding update message transmitted to a home agent to register the CoA with the home agent and transmitting the list of correspondent nodes; piggybacking information on a random number encrypted by a secret key shared by the home agent and a mobile node in a binding acknowledge message and receiving the piggybacked information from the home agent; and requesting a correspondent node to perform authentication of the address ownership of the corresponding mobile node using a zero knowledge technique, the corresponding node piggybacking result values processing the CoA, the random number and the secret key by hash functions in the binding update message transmitted to the corresponding correspondent node to register the CoA with the correspondent node, transmitting the piggybacked result values, encrypting the result values processed by the hash functions, and receiving the encrypted result values from the home agent.

According to still another aspect of the present invention, a method is provided including: receiving a list of correspondent nodes piggybacked in a binding update message for registering a care-of address (CoA) from the mobile node; producing a random number, encrypting the random number by a secret key shared by a home agent and a mobile node, piggybacking the random number in a binding acknowledge message, and transmitting the binding acknowledge message having the random number to the mobile node; and obtaining public keys of corresponding correspondent nodes based on the list of correspondent nodes and comparing the information received from the mobile node to authenticate ownership of the corresponding mobile node in the correspondent node, encrypting information required for authentication of the mobile node using the public keys, piggybacking the encrypted information in data tunneled to the correspondent nodes and transmitting the piggybacked information upon the mobile node piggybacking information required for ownership authentication in a binding update message to register the CoA with the correspondent node and transmitting the piggybacked information.

According to yet another aspect of the present invention, a method is provided including: transmitting a public key to a home agent upon the home agent of a mobile node requesting the public key from a correspondent node from while communicating with the mobile node; decrypting encrypted result values using a secret key of the correspondent node upon result values processed by hash functions and encrypted by the public key being received together with data of the mobile node tunneled from the home agent of the mobile node; receiving result values, processed by hash functions, piggybacked in a binding update message and transmitted from the mobile node communicating with the correspondent node; and comparing the hash-function-processed result values received from the home agent to the hash-function-processed result values received from the mobile node to authenticate ownership of a corresponding Care-of Address (CoA) of the mobile node transmitting a binding update message containing the CoA.

According to a further aspect of the present invention, a method is provided including: producing a random number, encrypting the random number by a secret key shared by the home agent and the mobile node, and transmitting the encrypted random number to the mobile node by a home agent upon a mobile node transmitting a list of correspondent nodes requiring registration of a Care-of Address (CoA); obtaining public keys of corresponding correspondent nodes based on the list of correspondent nodes and encrypting a first information required for authentication of the mobile node using the public keys, and transmitting the encrypted first information to the correspondent nodes by the home agent; and decrypting the first information received from the home agent by using a secret key of the correspondent node, and comparing the first information with a second information received from the mobile node to authenticate ownership of the corresponding mobile node by the correspondent node upon the mobile nodes transmitting the second information required for authentication of CoA ownership to the correspondent node.

The first information and the second information preferably comprise result values processed by hash functions to prove the ownership of the mobile node using a zero knowledge technique.

The hash-function-processed result values preferably comprise result values processing the CoA, the random number and the secret key by hash functions.

According to another aspect of the present invention, a method is provided including: transmitting a list of correspondent nodes requiring registration of a Care-of Address (CoA) to a home agent; receiving information from the home agent on a random number encrypted by a secret key shared by the home agent and a mobile node; and transmitting result values processing the CoA, the random number and the secret key by hash functions to the correspondent node and requesting the correspondent node to authenticate address ownership of the corresponding mobile node using a zero knowledge technique, the correspondent node encrypting the hash-function-processed result values and receiving the encrypted result values from the home agent.

According to a further aspect of the present invention, a method is provided including: receiving a list of correspondent nodes requiring registration of a Care-of Address (CoA) from a mobile node; producing a random number, encrypting the random number by a secret key shared by a home agent and the mobile node, and transmitting the encrypted random number to the mobile node; and obtaining public keys of the corresponding correspondent nodes based on the list of correspondent nodes to facilitate the correspondent node comparing the information received from the mobile to authenticate ownership of the corresponding mobile node, encrypting information required for authentication of the mobile node using the public keys, and transmitting the encrypted information upon the mobile node transmitting information required for CoA ownership authentication to the correspondent node.

According to yet a further aspect of the present invention, a method is provided including: transmitting a public key to a home agent upon a home agent of a mobile node requesting a public key from a correspondent node while communicating with the mobile node; receiving result values processed by hash functions and encrypted by the public key from the home agent of the mobile node and decrypting the encrypted result values using a secret key of the correspondent node; receiving result values processed by hash functions from the mobile node communicating with the correspondent node; and comparing the hash-function-processed result values received from the home agent to the hash-function-processed result values received from the mobile node to authenticate ownership of a corresponding Care-of Address (CoA) of the mobile node upon a binding message containing the CoA being transmitted.

According to another aspect of the present invention, a system is provided including: a mobile node; a home agent of the mobile node; and at least one correspondent node adapted to communicate with the mobile node; wherein the mobile node is adapted to piggyback a list of correspondent nodes requiring registration of a Care of Address (CoA) in a binding update message to register the CoA with a home agent and to transmit the binding update message having the list of correspondent nodes to the home agent; wherein the home agent is adapted to produce a random number, to encrypt the random number using a secret key shared by the home agent and the mobile node, to piggyback the encrypted random number in a binding acknowledge message, and to transmit the binding acknowledge message having the encrypted random number to the mobile node; wherein the home agent is adapted to obtain public keys of corresponding correspondent nodes based on the list of correspondent nodes, to encrypt first information required for authentication of the mobile node using the public keys, to piggyback the encrypted first information in data tunneled to the correspondent nodes, and to transmit the data having the encrypted first information to the correspondent nodes; wherein the mobile node is adapted to piggyback second information required for ownership authentication in the binding update message to register the CoA with the correspondent node and to transmit the binding update message having the second information to the correspondent node; and wherein the correspondent node is adapted to decrypt the first information received from the home agent using a secret key of the correspondent node and to compare the first information to the second information received from the mobile node to authenticate ownership of the corresponding mobile node.

According to yet another aspect of the present invention, a system is provided including: a mobile node; a home agent of the mobile node; and at least one correspondent node is adapted to communicate with the mobile node; wherein the mobile node is adapted to transmit a list of the correspondent nodes requiring registration of a Care-of Address (CoA); wherein the home agent is adapted to produce a random number and to encrypt the random number by a secret key shared by the home agent and the mobile node, and to transmit the encrypted random number to the mobile node; wherein the home agent is adapted to obtain public keys of corresponding correspondent nodes based on the list of correspondent nodes and to encrypt first information required for authentication of the mobile node using the public keys, and to transmit the encrypted first information to the correspondent nodes; wherein the mobile nodes is adapted to transmit second information required for authentication of CoA ownership to the correspondent node; and wherein the correspondent node is adapted to decrypt the first information received from the home agent using a secret key of the correspondent node, and to compare the first information to the second information received from the mobile node to authenticate ownership of the corresponding mobile node.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
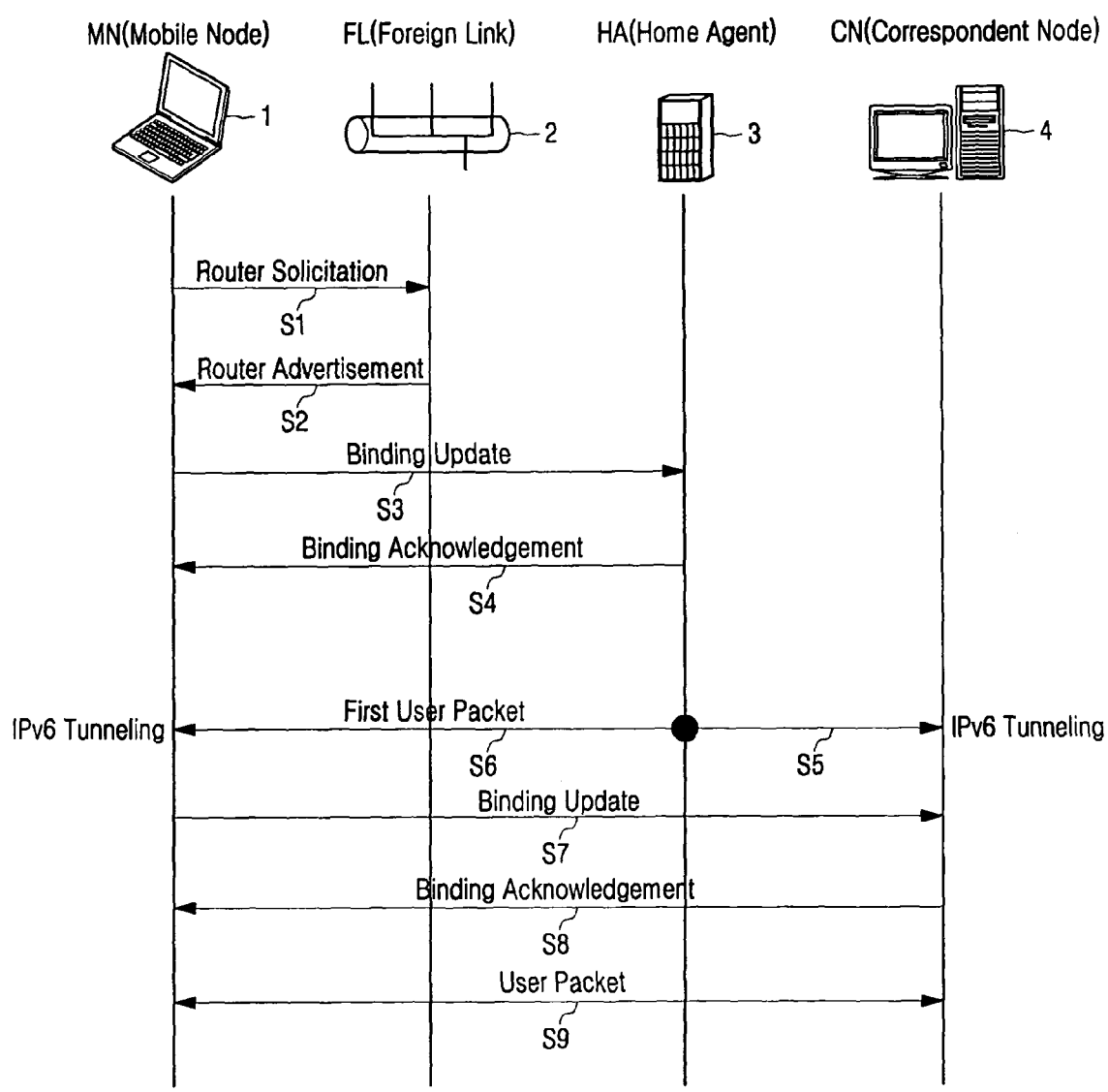
FIG. 1 is a view of a procedure where a mobile node moves to a foreign link to bind a CoA and performs communication.

FIG. 1 is a view of a procedure where a mobile node moves to a foreign link to bind a CoA and performs communication.

Referring to FIG. 1, when a mobile node (MN) 1 communicating with an arbitrary correspondent node (CN) 4 moves from its own home network to an arbitrary foreign link (FL) 2, the MN 1 transmits a router solicitation (RS) message to the FL 2 (S1). The FL 2 then transmits a router advertisement (RA) message to the MN 1 (S2). The MN 1 obtains a network prefix of the FL from the RA message, and creates a CoA to be used in the FL 2 through address auto-configuration.

Then, the MN 1 transmits a binding update message to the HA 3 to inform it that it has moved to the FL 2 (S3).

When the HA 3 receives the binding update message from the MN 1 informing it that the CoA is allocated from the FL 2 as the MN 1 moves to the FL 2, the HA 3 stores the CoA contained in the binding update message received from the MN 1 together with a home address of the MN 1, and transmits a binding acknowledgment message to the MN 1 informing it that a binding of the CoA to the MN 1 has been carried out normally (S4).

Then, the HA 3 tunnels data transmitted from the MN 1 to the CN 4 before the MN 1 binds the CoA to the CN 4 (S5), and tunnels data transmitted from the CN 4 to the MN 1 (S6).

Next, the MN 1 transmits a binding update message to the CN 4 in order to perform a binding update of the CoA (S7).

The CN 4 receives the binding update message from the MN 1 to perform the binding update, and then transmits a binding acknowledgment message to the MN 1 (S8).

As a result, both the MN 1 receiving the binding acknowledgment message from the CN 4 and the CN 4 form a tunnel therebetween, and transceive the data through the formed tunnel (S9).

However, when a malicious mobile IPv6 host binds a wrong CoA to the CN 4 while the MN 1 creates the CoA and registers it with the HA, an authorized IPv6 host having a home network address which the malicious IPv6 host is disguising can not communicate with the CN 4.

This is because the mobile IPv6 host fails to prove ownership of its own IPv6 address used in the process of registering the CoA with the HA and the CN.

The present invention will now be described more fully hereinafter with reference to the accompanying drawings, in which exemplary embodiments of the present invention are shown. The present invention can, however, be embodied in different forms and should not be construed as being limited to the embodiments set forth herein. Rather, these embodiments are provided so that this disclosure will be thorough and complete, and will fully convey the scope of the present invention to those skilled in the art. In the drawings, like numbers refer to like elements throughout the specification.

Figure 2:
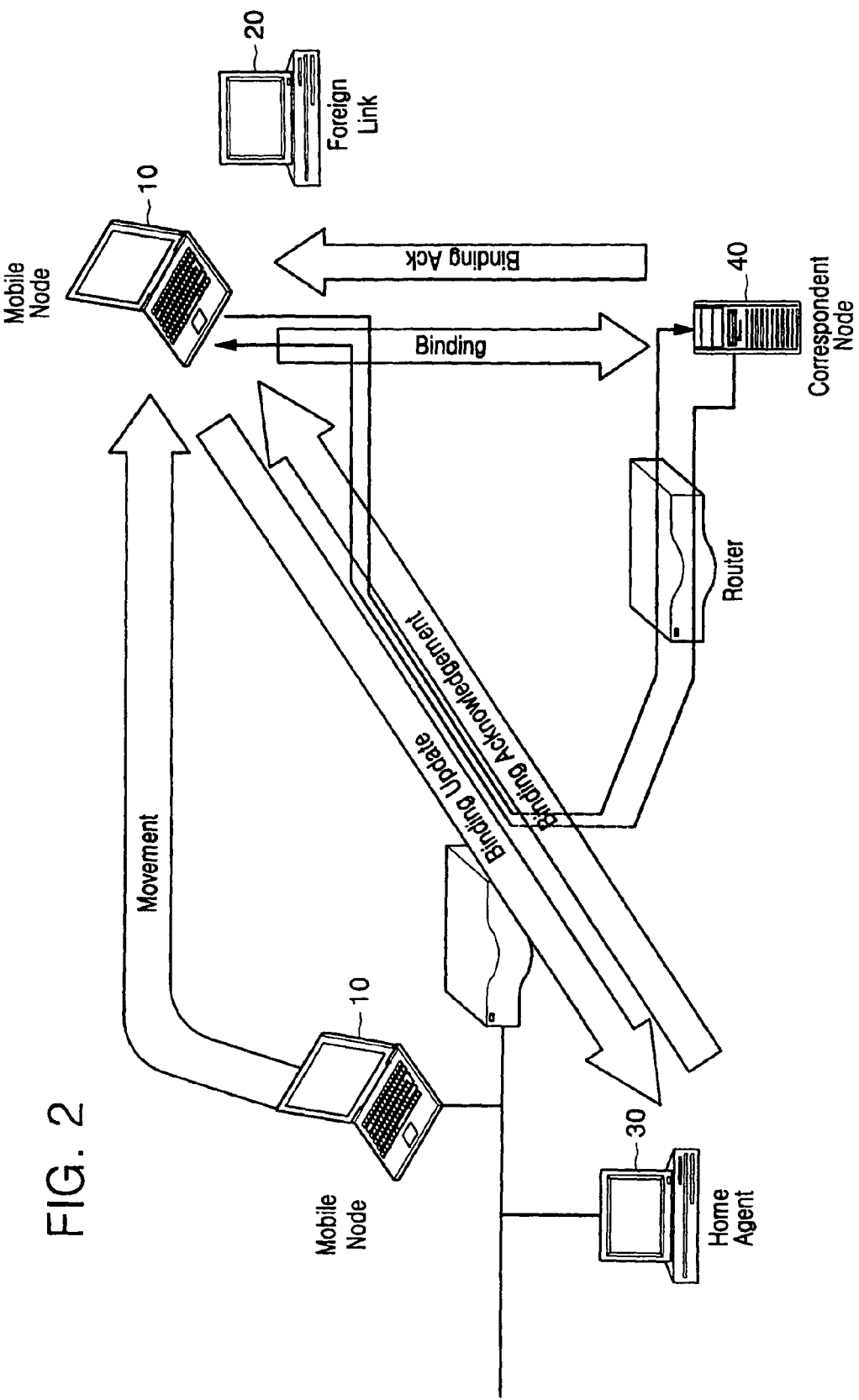
FIG. 2 is a view of a configuration of a communication system according to an embodiment of the present invention.

FIG. 2 is a view of a configuration of a communication system according to an embodiment of the present invention.

Referring to FIG. 2, the communication system of the present invention includes a mobile node (MN) 10, a home agent (HA) 30 of the MN 10, and at least one correspondent node (CN) 40 which communicates with the MN 10.

When the MN 10 moves to a foreign link 20 while communicating with any one of the CNs 40, the MN 10 transmits a Router Solicitation (RS) message to the foreign link 20 to induce a Router Advertisement (RA) message. The MN 10 obtains a network prefix of the foreign link 20 from the RA message in order to create a Care-of Address (CoA) which is intended for use in the foreign link 20 through address auto-configuration.

Then, the MN 10 transmits the CoA, obtained from the foreign link 20, to the HA 30 through a binding update message in order to inform movement to the foreign link 20. The MN 10 piggybacks a list of the CNs 40 with which it has been communicating before moving to the foreign link 20 in a binding update message, and transmits the piggybacked binding update message to the HA 30.

The MN 10 receives a binding acknowledge message from the HA 30. The binding acknowledge message is encrypted and piggybacked by a Random Number (RN) serving as a temporary secret key which the MN 10 will use to bind the CoA, wherein the RN functions as a secret key SS(HN) which is shared by the MN 10 and the HA 30.

Thus, the MN 10 obtains the RN piggybacked to the binding acknowledge message by using its own secret key SS(HN).

The MN 10 then tunnels data, which has been transmitted prior to binding the CoA to the CN 40 with which it has been communicating before moving to the foreign link 20, to the CN 40 by means of the HA 30.

Therefore, the HA 30 tunnels the data of the MN 10 to the CN 40. In this process, before tunneling the data of the MN 10 to the CN 40, the HA 30 piggybacks the data of the MN 10 in a data packet tunneling data which the CN 40 requires to prove CoA ownership of the MN 10 when the MN 10 binds the CoA to the CN 40, and transmits the piggybacked data.

The data piggybacked from the HA 30 to the CN 40 includes result values processing the CoA that the HA 30 has received from the MN 10, the RN, and the secret key (SS) shared by the HA 30 and the MN 10 by means of hash functions.

Thereafter, the MN 10 transmits the binding update message to binding-update the CoA to the CN 40. The MN 10 piggybacks result values, which process the CoA, the RN and the secret key SS by means of one-way hash functions, in the binding update message, and transmits the piggybacked binding update message to the CN 40.

Thereafter, the MN 10 gains authentication as to whether or not the hash-function-processed result values transmitted to the CN 40 are significant values. As a result, when the MN 10 is authenticated to have an authorized ownership of the CoA, the MN 10 receives a binding update acknowledge message from the CN 40.

When the HA 30 receives the binding update message from an arbitrary MN 10 informing that the CoA is allocated from the foreign link 20 as the MN 10 moves to the foreign link 20, the HA 30 extracts the CN list piggybacked in the binding update message.

Then, the HA 30 stores the CoA contained in the binding update message received from the MN 10 together with the home address of the MN 10, and transmits a binding acknowledgement message to the MN 10, wherein the binding acknowledgement message is for informing it that binding the CoA to the MN 10 has been carried out normally.

The HA 30 encrypts the RN serving as a secret key which the MN 10 will temporarily use to bind the CoA by the secret key SS(HN) which is shared by the MN 10 and the HA 30, piggybacks the encrypted RN in the binding acknowledge message, and then transmits the piggybacked result.

The RN is transmitted to prevent an intrusion of a malicious host which is disguised as the MN 10 using the home network address and CoA of the MN 10.

The RN is encrypted by using the secret key SS(HN) shared by the HA 30 and the MN 10 in order to safely transmit the RN because a secret key encryption technique using encryption and decryption keys performs fast, easy calculation in the process of encryption/decryption. The limited supply of power, etc. does not permit the MN 10 to perform a lot of calculations for encryption/decryption.

Then, the HA 30 tunnels data, which has been transmitted from the MN 10 before the MN 10 binds the CoA to the CN 40, to the CN 40. Before tunneling the data of the MN 10 to the CN 40, the HA 30 piggybacks the data of the MN 10 in a data packet tunneling the data which the CN 40 requires to prove the CoA ownership of the MN 10 when the MN 10 binds the CoA, and transmits the piggybacked data.

For the purpose of safely transmitting the piggybacked data, the HA 30 requires an additional message exchange to obtain a Public Key (PK) of the CN 40 with which the MN 10 has communicated before moving to the foreign link 20. Thus, the HA 30 requests the corresponding CN 40 to transmit its PK with reference to the CN list that is piggybacked in the binding update message received from the MN 10, thereby being brought the PK of the corresponding CN 40.

Once the HA 30 is brought the PK of the corresponding CN from arbitrary CNs 40, there is little possibility to previously share any secret key except the data tunneling function. For this reason, an overhead for the additional message exchange required to additionally obtain the PK is not needed when the MN 10 changes and registers the CoA with the identical CN 40.

The HA 30, which has obtained the PKs of the corresponding respective CNs from on the basis of the transmitted CN list, encrypts information that is used to prove an address ownership of the MN 10 and is provided to the CN 40 by using the corresponding PK and transmits the encrypted information to the corresponding CN 40. The HA 30 transmits, to the CN 40, result values which makes use of the CoA which the MN 10 will bind, the RN, and the secret key SS which the MN and the HA share as input data in the one-way hash function. The HA 30 uses a zero knowledge technique which is possible to prove without exposing the information, such as the secret key SS and the RN, to the arbitrary CN 40. The piggybacked message which the HA 30 transmits to the CN 40 is encrypted using the PK of the CN 40, so that only the corresponding CN 40 can decrypt it.

When receiving the binding message of the CoA from an arbitrary MN 10, the CN 40 determines whether or not the corresponding MN 10 has authorized ownership of the CoA using the one-way hash-function-processed result values transmitted from the HA 30.

When the CN 40 receives a request of its own public key from the HA 30 while communicating with an arbitrary MN 10, the CN 40 transmits its own PK to the corresponding HA 30.

Thereafter, when the CN 40 receives the hash-function-processed result values encrypted by its own PK together with data of the MN 10 tunneled from the HA 30, the CN 40 decrypts them by using its own secret key.

Also, the CN 40 receives the binding update message from the MN 10 with which it has communicated. The CN 40 receives the hash-function-processed result values piggy-backed in the binding update message.

The CN 40 compares the hash-function-processed result values received from the HA 30 to those received from the MN 10 to determine whether or not the MN 10 which has transmitted the binding update message containing the CoA has the authorized ownership of the corresponding CoA.

When it is determined that the MN 10 has the authorized ownership of the corresponding CoA, the CN 40 transmits a binding acknowledge message to the corresponding MN 10, and the MN 10 forms a tunnel through which a data transaction is performed.

Figure 3:
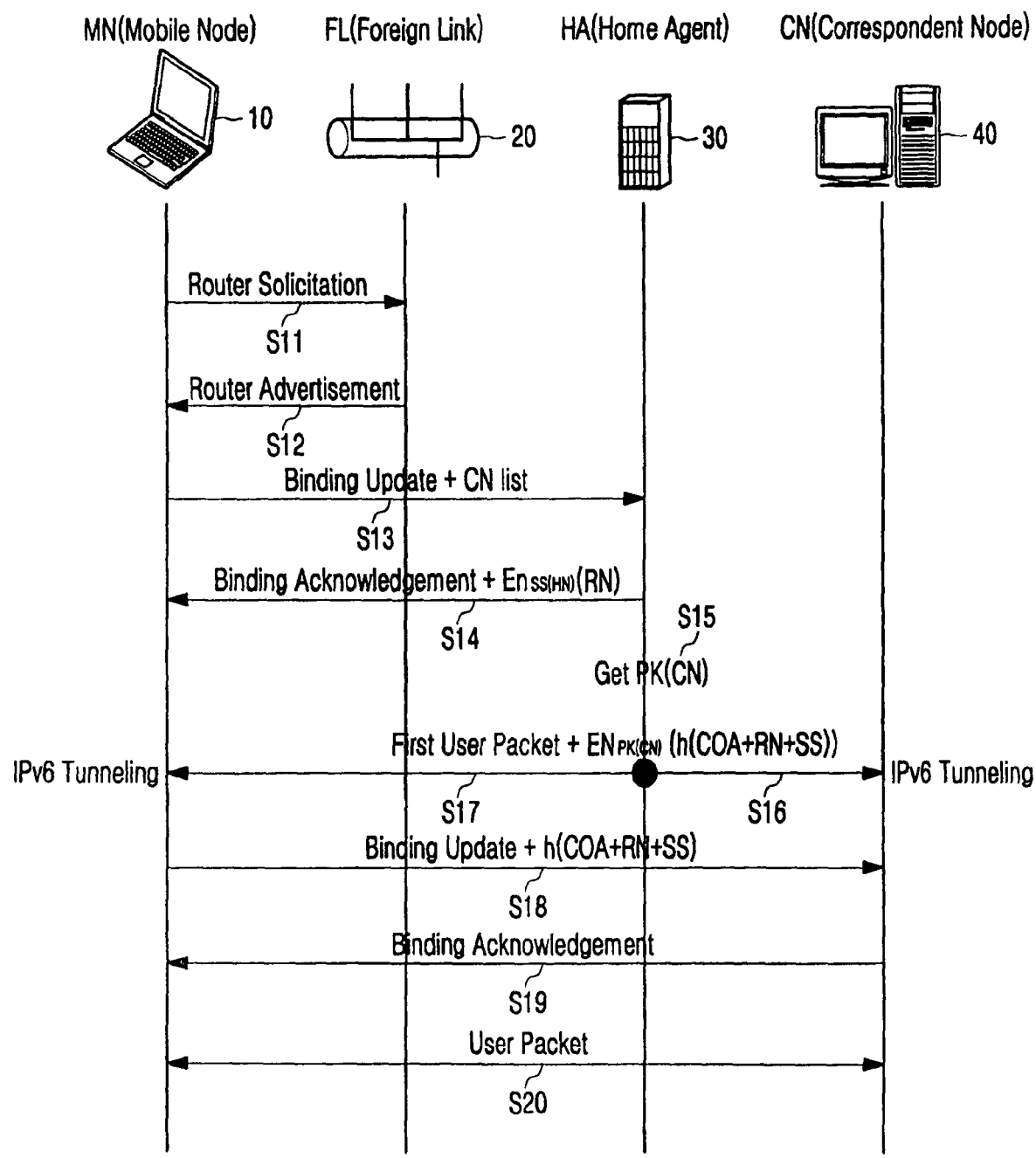
FIG. 3 is is a view of a general procedure of authenticating address ownership according to an embodiment of the present invention.

FIG. 3 is a view of a procedure of authenticating address ownership according to an embodiment of the present invention.

Referring to FIG. 3, when the MN 10 which is communicating with an arbitrary one of the CN 40s moves from its home network to an arbitrary one of the foreign links 20, the MN 10 transmits a RS message to the arbitrary foreign link 20 (S11). The arbitrary foreign link 20 then transmits a RA message to the MN 10 (S12). The MN 10 obtains a network prefix of the arbitrary foreign link 20 from the RA message, and creates a CoA to be used in the arbitrary foreign link 20 through an address auto-configuration.

Thereafter, the MN 10 transmits a binding update message to the HA 30 to inform it that it has moved to the foreign link 20. The MN 10 then piggybacks a list of the CNs 40 with which it has been communicating before moving to the foreign link 20 in the binding update message and transmits the piggybacked CN list to the HA 30 (S13).

When the HA 30 receives the binding update message from the MN 10 informing it that the CoA has been allocated from the foreign link 20 as the MN 10 moves to the foreign link 20, the HA 30 extracts the CN list piggybacked in the binding update message.

Thereafter, the HA 30 stores the CoA contained in the binding update message received from the MN 10 together with a home address of the MN 10, and transmits a binding acknowledgment message to the MN 10 informing it that the CoA has been bound to the MN 10.

The HA 30 encrypts a RN which serves as a secret key that the MN 10 will temporarily use to bind the CoA by using a secret key SS(HN) shared by the HA 30 and the MN 10, piggybacks the encrypted RN in the binding acknowledge message, and then transmits the piggybacked RN (S14).

The HA 30 requests the corresponding CN 40 to bring a PK of the corresponding CN with reference to the CN list piggybacked in the binding update message received from the MN 10 (S15).

The HA 30 then tunnels data, which has been transmitted from the MN 10 before the MN 10 binds the CoA to the CN 40, to the CN 40.

Before tunneling the data of the MN 10 to the CN 40, the HA 30 piggybacks the data of the MN 10 into data packet encrypting and tunneling data which the CN 40 requires to prove the CoA ownership of the MN 10 when the MN 10 binds the CoA by using the corresponding PKs obtained from the respective CNs 40 based on the CN list transmitted from the MN 10, and transmits the piggybacked data to the corresponding CN 40 (S16), and then tunnels data transmitted from the CN 40 to the MN 10 (S17).

Information that the HA 30 transmits to the CN 40 includes values of the CoA that the MN 10 will bind, values of the RN and values of the secret key SS shared by the MN 10 and the HA 30. The HA 30 transmits result values to the CN 40, the result values calculated using these values as input data of one-way hash functions.

When receiving the hash-function-processed result values which has been encrypted by its public key PK and transmitted from the HA 30 together with the data of the MN 10, the CN 40 decrypts the received result values by using its own secret key.

Thereafter, the MN 10 transmits the binding update message to the CN 40 to binding-update the CoA. The one-way hash-function-processed result values of the CoA, the RN and the secret key SS are piggybacked in the binding update message and transmitted (S18).

The CN 40 receives the binding update message from the MN 10 and the hash-function-processed result values piggybacked in the binding update message.

The CN 40 compares the hash-function-processed result values, which have been encrypted by its public key PK and transmitted from the HA 30 and then decrypted by its secret key, with the hash-function-processed result values piggybacked in the binding update message received from the MN 10. The CN 40 determines whether or not the MN 10 which has transmitted the binding update message containing the CoA has the authorized ownership of the corresponding CoA according to whether or not the two values are matched.

The CN 40 transmits the binding acknowledge message to the corresponding MN 10, when the corresponding MN 10 is determined to have the authorized ownership of the corresponding CoA (S19).

Therefore, the MN 10, which is recognized through the binding acknowledge message transmitted from the CN 40 to have the authorized ownership of the CoA contained in the binding update message which it has transmitted to the CN 40, forms a tunnel to the CN 40, and transceives the data through the tunnel (S20).

In the embodiment described above, information on the CN list that the MN 10 transmits to the HA 30, information obtained by encrypting the RN by means of the secret key which is transmitted from the HA 30 to the MN 10, information obtained by encrypting the CoA, the RN and the secret key SS by means of the PK transmitted from the HA 30 to the CN 40, and the hash-function-processed result values of the CoA, the RN and the secret key SS which are transmitted from the MN 10 to the CN 40 are piggybacked in the message transceived between the MN 10 and the HA 30 and the CN 40 and transceived.

The piggybacking allows the desired data to be transmitted by using an authentication header, i.e., an option header of the IPv6.

Figure 4:
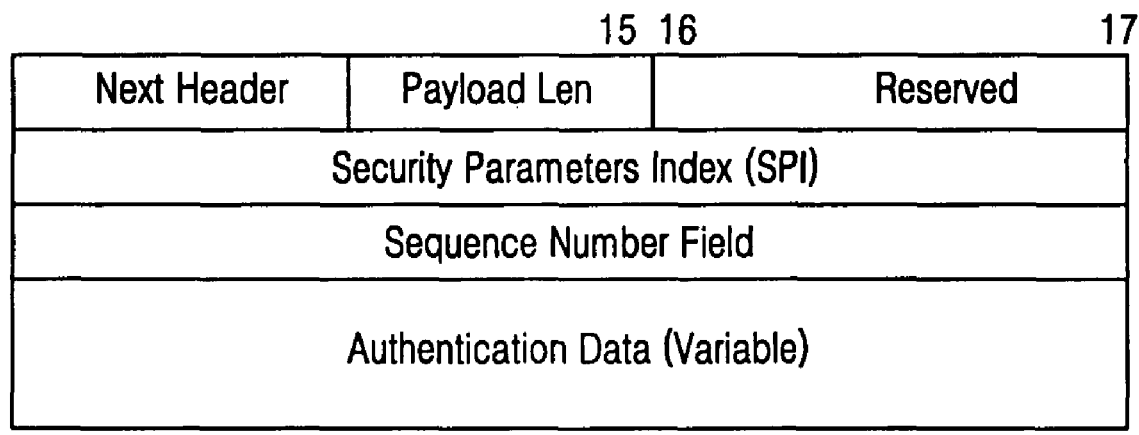
FIG. 4 is a view of a format of an authentication header according to an embodiment of the present invention.

FIG. 4 is a view of a format of an authentication header according to an embodiment of the present invention. As shown in FIG. 4, the CN list information that the MN 10 transmits to the HA 30, the information obtained by encrypting the RN by means of the secret key which is transmitted from the HA 30 to the MN 10, the information obtained by encrypting the CoA, the RN and the secret key SS by the PK which are transmitted from the HA 30 to the CN 40, and the hash-function-processed result values of the CoA, the RN and the secret key SS which are transmitted from the MN 10 to the CN 40 are set in an authentication data field and transceived between the MN 10 and the HA 30 and the CN 40.

However, the present invention is not limited to piggybacking and transceiving the information in the message transceived between the MN 10 and the HA 30 and the CN 40. That is, each of the information can be transmitted through separate messages regardless of the message transceived through the standards between the MN 10 and the HA 30 and the CN 40.

An address ownership authentication method using a CoA binding protocol according to another embodiment of the present invention can comprise: when a MN transmits, to an HA, a list of CNs with which a CoA needs to be registered, producing, by the HA, an RN, encrypting the RN by means of a secret key shared by the HA and the MN, and transmitting the encrypted RN to the MN; obtaining, by the HA, PKs of the corresponding CNs based on the CN list and encrypting first information required for authentication of the MN by using the PKs, and transmitting the encrypted first information to the CNs; and when the MN piggybacks and transmits second information required for authentication of CoA ownership to the CN, decrypting, by the CN, the first information received from the HA by using a secret key of the CN, and comparing the first information to the second information received from the MN to authenticate the ownership of the corresponding MN.

The first information and the second information can be result values processed by hash functions, in order to prove the ownership of the MN using a zero knowledge technique, and the hash-function-processed result values can be result values processing the CoA, the RN and the secret key using the hash functions.

Furthermore, an address ownership authentication method of a mobile node using a CoA binding protocol according to another embodiment of the present invention can comprise: transmitting, to an HA, a list of CNs with which a CoA needs to be registered; receiving, from the HA, information on an RN encrypted by a secret key shared by the HA and the MN; and transmitting hash-function-processed result values of the CoA, the RN, and the secret key to the CN and requesting the correspondent node receiving the encrypted result values from the HA to perform authentication of address ownership of the corresponding MN by using a zero knowledge technique.

A data processing method of a home agent for an address authentication of a mobile node according to another embodiment of the present invention can comprise: receiving, from the MN, a list of CNs with which the MN needs to register a CoA; producing an RN, encrypting the RN by means of a secret key shared by the HA and the MN, and transmitting the encrypted RN to the MN; and when the MN transmits information required for CoA ownership authentication to the CN, obtaining PKs of the corresponding CNs based on the CN list, encrypting information required for the authentication of the MN using the PKs, and transmitting the information in order for the CN to compare the information received from the MN with the information received from the HA to authenticate the ownership of the corresponding MN.

A data processing method of a correspondent node for an address ownership of a mobile node according to another embodiment of the present invention can comprise: when the CN is requested for a PK from an HA of the MN while communicating with the MN, transmitting the PK of the CN to the HA; receiving, from the HA of the MN, result values processed by hash functions and encrypted by the PK and decrypting the encrypted result values by using a secret key of the CN; receiving the decrypted result values from the MN communicating with the CN; and when a binding message containing a CoA is transmitted, comparing the result values received from the HA to the result values received from the MN and performing a procedure for authenticating ownership for the corresponding CoA of the MN.

A communication system according to another embodiment of the present invention includes a MN; a HA of the MN; and at least one CN communicating with the MN, wherein the MN transmits a list of the CNs with which a CoA needs to be registered, and the HA produces an RN and encrypts the RN by means of a secret key shared by the HA and the MN, and transmits the encrypted RN to the MN; wherein the HA obtains a PK of a corresponding CN based on the CN list and encrypts first information required for authentication of the MN by using the PK, and transmits the encrypted first information to the CNs, and wherein the MN transmits second information required for authentication of CoA ownership to the CN, and the CN decrypts the first information received from the HA by using its secret key, and compares the first information with the second information received from the MN to authenticate the ownership of the corresponding MN.

The first information and the second information can be result values processed by hash functions in order to prove the ownership of the MN using a zero knowledge technique, and the result values processed by hash functions can be result values processing the CoA, the random number and the secret key through the hash functions.

As described above, according to the present invention, in the first step, the MN piggybacks the CN list in the binding update message containing the CoA and transmits it to the HA, and the HA piggybacks the RN in the binding acknowledge message which is encrypted by the secret key (SS) shared by the MN and the HA and transmits it to the MN.

In the next step, the HA obtains respective PKs from the corresponding CNs based on the corresponding CN list, and encrypts result values processing the CoA received from the MN, the RN transmitted to the MN and the secret key shared by the MN and HA by means of hash functions and transmits it.

In the final step, the MN piggybacks the hash-function-processed result values of the CoA, the RN and the secret key (SS) shared by the MN and the HA in the binding update message containing the CoA and transmits them to the CN, the CN compares the hash-function-processed result values transmitted from the HA with the hash-function-processed result values transmitted from the MN to thereby authenticate that the corresponding MN has the authorized ownership of the CoA.

That is, when the MN piggybacks result values processing the CoA, the RN and the secret key (SS) by the hash functions and transmits them to the CN when requesting the CN to perform binding update, the CN compares the hash-function-processed result values from the MN with the hash-function-processed result values of the CoA, the RN and the secret key (SS) which has been previously received from the HA to authenticate the ownership of the MN. Therefore, even though a malicious host who does not know the secret key SS shared only by the MN and the HA but knows the home address of the MN tries the binding-update with respect to the CN using an arbitrary CoA, it fails to create the hash-function-processed result values piggybacked in the binding update message, thereby preventing the address of the authorized host from being invaded by the malicious host.

Therefore, the address ownership of the CoA varied according to the mobility characteristic of the mobile IPv6 can be proved, and thus network security is guaranteed.

The message used to resolve the address ownership problem is piggybacked in the basic message of the mobile IPv6, and thus the overhead is small on transmitting and processing the message.

Furthermore, when the HA of the mobile IPv6 is provided to the router for an essential function, when hardware support using a security chip is possible, high speed processing can be achieved.

Although exemplary embodiments of the present invention have been described, it will be understood by those skilled in the art that the present invention is not limited to the described embodiments. Rather, various changes and modifications can be made within the spirit and scope of the present invention, as defined by the following claims.

What is claimed is:

1. A method, comprising:

piggybacking, at a mobile node, a list of correspondent nodes requiring registration of a Care-of-Address (CoA) of the mobile node to be used in a foreign link in a binding update message to register the CoA with a home agent, and transmitting the binding update message having the list of correspondent nodes to the home agent;

upon a reception of the binding update message having the list of correspondent nodes at the home agent, producing a random number at the home agent, encrypting the random number using a secret key shared by the home agent and the mobile node, piggybacking the encrypted random number in a binding acknowledge message, and transmitting the binding acknowledge message having the encrypted random number to the mobile node from the home agent;

obtaining, at the home agent, public keys of corresponding correspondent nodes listed on the list of correspondent nodes, encrypting at the home agent, first information required for authentication of the mobile node using the public keys, piggybacking at the home agent, the encrypted first information in data to be tunneled to the correspondent nodes, and transmitting the data having the encrypted first information from the home agent to the correspondent nodes;

piggybacking, at the mobile node, second information required for ownership authentication for the binding update message for registering the CoA with a corresponding correspondent node, and transmitting the binding update message having the second information to the corresponding correspondent node;

upon a reception of the data to be tunneled to the correspondent nodes having the encrypted first information at the corresponding correspondent node, decrypting, at the corresponding correspondent node, the first information received from the home agent using a secret key of the corresponding correspondent node; and upon a reception of the binding update message having the second information and a completion of the decryption of the first information, comparing, at the corresponding correspondent node, the first information received from the home agent with the second information to authenticate ownership of the corresponding mobile node.

2. The method of claim 1, wherein the first information and the second information comprise result values processed by hash functions to prove the ownership of the mobile node using a zero knowledge technique.

3. The method of claim 2, wherein the result values processed by hash functions comprise result values processing the CoA, the random number and the secret key using the hash functions.

4. The method of claim 1, further comprising using previously stored public key information of the corresponding correspondent node at the home agent, when the list of correspondent nodes that the home agent has received from the arbitrary mobile node includes the correspondent node having the previously stored information of the public key.

5. A method, comprising:

piggybacking, at a mobile node, a list of correspondent nodes requiring registration of a Care-of-Address (CoA), in a binding update message transmitted to a home agent to register the CoA with the home agent, and transmitting, at the mobile node, the list of correspondent nodes;

piggybacking, at the home agent, information on a random number encrypted by a secret key shared by the home agent and a mobile node, in a binding acknowledge message, and receiving, at the mobile node, the piggybacked information from the home agent;

piggybacking, at a corresponding mobile node, result values calculated by processing the CoA, the random number and the secret key by hash functions, in the binding update message transmitted to a corresponding correspondent node to register the CoA of the mobile node with the corresponding correspondent node;

transmitting, at the corresponding mobile node, the piggybacked result values to the corresponding correspondent node, encrypting, at the home agent, the result values processed by the hash functions, and receiving, at the correspondent node, the encrypted result values from the home agent; and upon the reception of the encrypted result values at the correspondent node, requesting the correspondent node to perform authentication of the address ownership of the corresponding mobile node using a zero knowledge technique.

6. A method, comprising:

receiving, at a home agent, a list of correspondent nodes piggybacked in a binding update message for registering a care-of address (CoA) from a mobile node;

producing, at the home agent, a random number, encrypting the random number by using a secret key shared by a home agent and the mobile node, piggybacking, at the home agent, the encrypted random number in a binding acknowledge message, and transmitting, at the home agent, the binding acknowledge message having the encrypted random number to the mobile node;

piggybacking, at a corresponding mobile node, information required for ownership authentication in a binding update message to register the CoA with a correspondent node, and transmitting the piggybacked binding update message having the information from the corresponding mobile node to the corresponding correspondent node;

obtaining at the home agent, public keys of corresponding correspondent nodes listed on the list of correspondent nodes, encrypting at the home agent, information required for authentication of the corresponding mobile node by using the public keys, and piggybacking at the home agent, the encrypted information in data tunneled to the correspondent nodes; and upon reception, by the corresponding correspondent node, of the piggybacked binding update message having the information from the corresponding mobile node and the data having the encrypted information, comparing the information received from the mobile node to authenticate ownership of the corresponding mobile node in the correspondent node.

7. A method, comprising:

transmitting a public key to a home agent, in response to the home agent of a mobile node requesting the public key from a correspondent node which communicates with the mobile node;

upon a reception, by the correspondent node, of data of the mobile node tunneled from the home agent of the mobile node, with the data containing a first resulting value obtained by processing a predetermined group of values comprising a care-of address (CoA) of the mobile node by hash functions and by encrypting the value processed with hash functions by application of by the public key, decrypting, at the correspondent node, the first encrypted resulting value by using a secret key of the correspondent node;

receiving, from the mobile node, a second resulting value obtained by processing the predetermined group of values comprising the care-of address (CoA) of the mobile node by the hash functions, piggybacked in a binding update message and transmitted from the mobile node communicating with the correspondent node; and comparing, at the correspondent node, the first decrypted resulting value received from the home agent to the second resulting value received from the mobile node in order to authenticate ownership of the corresponding Care-of Address (CoA) of the mobile node transmitting a binding update message containing the CoA.

8. A system, comprising:

a mobile node;

a home agent of the mobile node; and at least one correspondent node adapted to communicate with the mobile node;

wherein the mobile node piggybacks a list of correspondent nodes requiring registration of a Care of Address (CoA) in a binding update message to register the CoA with the home agent and transmits the binding update message having the list of correspondent nodes to the home agent;

wherein the home agent produces a random number, encrypts the random number using a secret key shared by the home agent and the mobile node, piggybacks the encrypted random number in a binding acknowledge message, and transmits the binding acknowledge message having the encrypted random number to the mobile node;

wherein the home agent obtains public keys of corresponding correspondent nodes listed on the list of correspondent nodes, encrypts first information required for authentication of the mobile node using the public keys, piggybacks the encrypted first information in data tunneled to the correspondent nodes, and transmits the data having the encrypted first information to the correspondent nodes;

wherein the mobile node piggybacks second information required for ownership authentication in the binding update message to register the CoA with the correspondent node and transmits the binding update message having the second information to the correspondent node; and wherein the correspondent node decrypts the first information received from the home agent by using a secret key of the correspondent node, and authenticates ownership of a corresponding mobile node by comparing the first information to the second information received from the mobile node.

* * * * *